Dec. 28, 1926.
S. QUISLING
1,612,743
ADJUSTABLE PNEUMATIC SCALE
Filed May 2, 1924
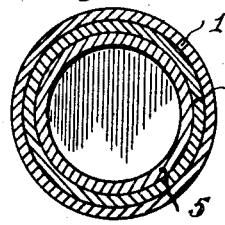
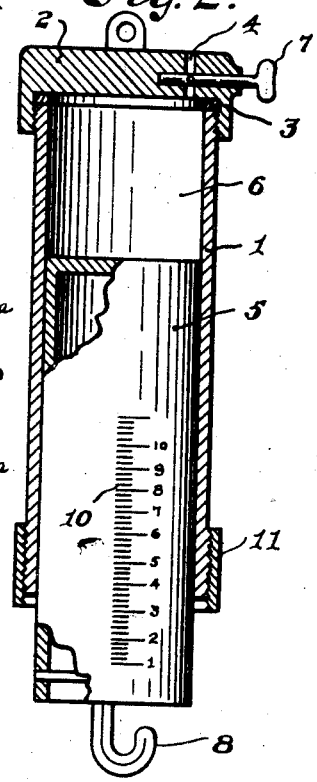
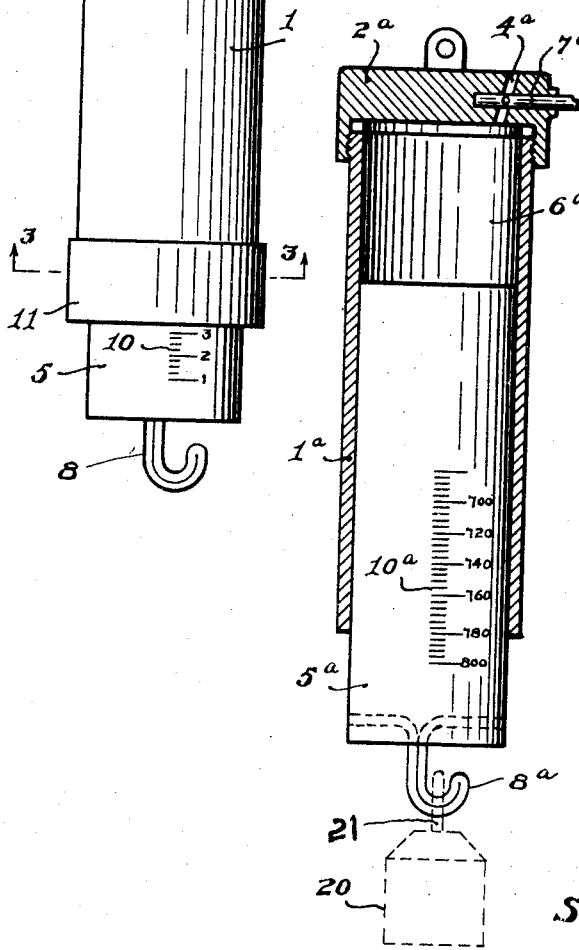
Sverre Quisling
INVENTOR
BY Victor J. Evans
ATTORNEY
WITNESS:

Patented Dec. 28, 1926.

1,612,743

UNITED STATES PATENT OFFICE.

SVERRE QUISLING, OF PHILADELPHIA, PENNSYLVANIA.

ADJUSTABLE PNEUMATIC SCALE.

Application filed May 2, 1924. Serial No. 710,652.

This invention comprehends the provision of a scale or device for the accurate determination of weights by means of a pneumatic spring device adjustable for all environmental conditions of temperature and atmospheric pressure. The adjustable pneumatic scale is based on the principle of Boyle's law for gases—to quote: "The volume of a gas varies inversely as the pressure upon it; and for the same temperature the density of a gas is directly proportional to the pressure acting upon it". Thus, by varying the density of a gas in a closed chamber by the pull of weights transmitted to a piston regulating the size of this chamber, there will be a change of volume of said gas and chamber, which is measured and is directly proportional to the respective weight applied. By use of a standard weight and varying the amount of gas in the chamber, the device may be made accurate and calibrated for each condition of barometric pressure and temperature.

More specifically, the invention includes a gas chamber with means for admitting desired quantities of gas and means for variation of the size of said chamber by a second part or piston fitting into the chamber like a piston, and means for measuring volumetric charges of gas being acted upon.

A further object of the invention is to provide an instrument as specified, which can, in addition to being used to measure weights, be used for measuring barometric pressure on the principle that the volume of the gas varies inversely as the pressure acting upon it, and thus by noting the variation of the volume of the gas in the chamber of the device, the size of which chamber is varied by the movable piston to which a constant force is applied, acting to increase the gas volume against the atmospheric pressure. In such use, either the piston may be graduated to show various volumes corresponding to various barometric pressures, or any suitable contrivance may be associated with the device for indicating barometric pressures.

Other objects of the invention are to provide a pneumatic adjustable scale which can be accurately calibrated for any barometric pressure and temperature, can be made of any suitable material, one which is simple in construction and accurate in the performing of its functions.

Figure 1 is a side elevation of the improved scale.

Figure 2 is a vertical section through the scale.

Figure 3 is a horizontal section through the scale taken on the line 3—3 of Figure 1.

Figure 4 is a vertical section through the invention, showing it used as a barometer.

Referring more particularly to the drawings, the improved scale comprises a cylindrical body 1 which is made of any suitable material and has its outer surface screw-threaded at its ends, as clearly shown in Figure 2 of the drawings. A cap 2 is threaded upon one end of the body 1 and a gasket 3 is used to provide a fluid-tight joint between the cylinder or body and the cap 2. The cap 2 is provided with a fluid inlet opening 4 which enters the interior of the body 1 inwardly of the piston 5, that is, in the gas chamber 6. A stop cock or valve 7 of any approved construction is carried by the cap for controlling the inlet of gas or air into or its outlet from the chamber 6.

The piston 5 fits tightly, preferably by an air tight or fluid-tight engagement with the inner surface of the cylindrical body 1, so as to prevent the escape of gas from the chamber 6 about the piston. If it is desired and necessary, an oil seal between the piston 5 and inner surface of the cylinder 1 may be used. The piston 5 has the hook 8 attached thereto at its lower end. The piston 5 is graduated or calibrated, as shown at 10, to indicate any known or given units of weight directly proportional to the volume of gas in the chamber 6. A ring 11 is adjustably mounted on the lower threaded end of the cylinder 1 and it is adjusted to zero of the scale graduations on the piston, after the scale is adjusted barometrically by changing the amount of gas in the chamber 6 to obtain the principal or correct tension, as can be determined by use of a constant weight and the scale reading.

From the foregoing description, taken in connection with the accompanying drawing, it will be apparent that a pneumatic scale has been provided which will permit accurate positive weighing of various articles, irrespective of the environmental conditions surrounding the scale, in that by operation of the valve 7, the pressure in the chamber 6 may be varied to give proper results at any barometric pressure or temperature.

Using the invention, as shown in Figure 4 of the drawings, the device is employed as a barometer, and in such construction, the piston $5^a$ has a weight 20 of any desired constant weight connected thereto in any suitable manner, such as by means of the rod 21. The weight 20 pulling on the piston $5^a$ against the force of the atmosphere will, in conjunction with the barometer calibrations $10^a$ show the barometric readings. In the modified form of the invention, the piston $5^a$ is shown graduated, as at $10^a$, as is also the piston 5, shown graduated at 10. However, it is to be understood, that a suitable scale having the graduations of either the weight or the barometric pressure, may be used in lieu of graduating the movable piston, and that an indicating arm or lever may be associated with the movable piston and scale to permit the readings.

The modified form of the instrument includes besides the piston $5^a$ and the weight 20, the body $1^a$ in which the piston $5^a$ is movable, and with the inner surface of which the piston has a fluid-tight engagement. The volume of gas in the chamber $6^a$ may be varied, by operation of the valve $7^a$ which controls the passage of air or gas into the chamber $6^a$ through the passage-way $4^a$ in the cap $2^a$.

While in the drawings and the foregoing description the bodies 1 have been referred to as cylindrical, it is to be understood that they may be of any desired shape or configuration found practical, without departing from the spirit of this invention.

It is, of course, to be understood, that the invention may be constructed in various other manners and the parts associated in different relations, and therefore, I do not desire to be limited in any manner except as set forth in the claim hereunto appended.

What I claim is:

In a device of the character described, the combination of a cylinder having a closure cap secured to the upper end thereof, a tubular piston disposed in said cylinder to form a variable fluid-tight chamber in said cylinder between said closure cap and piston, and having a graduated scale expressing units of weight provided on the outer periphery thereof adjacent its lower end, a suction release opening vertically disposed in said closure cap, a valve stem disposed in said closure cap at right angles to said release opening, an aperture in said valve stem for registration with said release opening, and a suspension hook depending from the lower end of said piston with its parallel and laterally extending ends disposed within and pivoted to the skirt thereof for attaching a weight to said hook to determine the weight thereof substantially as described.

In testimony whereof I affix my signature.

SVERRE QUISLING.